(12) United States Patent
Hoffnung

(10) Patent No.: US 6,659,696 B2
(45) Date of Patent: Dec. 9, 2003

(54) CASTER SECURING MECHANISM

(75) Inventor: Amanda Hoffnung, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/996,712

(22) Filed: Nov. 30, 2001

(65) Prior Publication Data

US 2003/0103830 A1 Jun. 5, 2003

(51) Int. Cl.[7] .................................................. B60P 7/08
(52) U.S. Cl. ................................ 410/66; 410/9; 410/19; 410/22; 16/34
(58) Field of Search .............................. 410/66, 67, 9, 410/19, 22, 7, 80; 248/188.2, 349.1, 351; 108/55.1; 16/32, 33, 34; 188/1.12, 5

(56) References Cited

U.S. PATENT DOCUMENTS

| | | | | |
|---|---|---|---|---|
| 1,092,506 A | * | 4/1914 | Oldroyd | |
| 1,228,993 A | * | 6/1917 | Souther | 410/22 |
| 1,402,211 A | * | 1/1922 | Cartmill | 410/66 |
| 1,687,631 A | * | 10/1928 | Oberwegner | |
| 1,699,290 A | * | 1/1929 | Goodspeed | 410/22 |
| 1,711,089 A | * | 4/1929 | Evans | 410/22 |
| 1,794,321 A | * | 2/1931 | Rebuck | 410/22 |
| 2,033,119 A | * | 3/1936 | Bennett | 410/66 |
| 2,033,207 A | * | 3/1936 | Schultz, Jr. | |
| 2,126,811 A | * | 8/1938 | Rambo et al. | |
| 2,262,288 A | * | 11/1941 | Klipstein et al. | |
| 2,278,885 A | * | 4/1942 | Kuhl | 410/66 |
| 2,674,466 A | * | 4/1954 | Robb | 410/67 |
| 3,219,152 A | * | 11/1965 | Castellani et al. | 410/66 |
| 3,913,973 A | * | 10/1975 | Mintz et al. | |
| 4,503,943 A | * | 3/1985 | Tsukui | |
| 4,923,346 A | * | 5/1990 | Hager | 410/19 |
| 4,930,937 A | * | 6/1990 | Fulton | |
| 5,593,259 A | * | 1/1997 | Kuo | 410/3 |
| 5,823,723 A | * | 10/1998 | Finch | 410/22 |
| 6,055,704 A | * | 5/2000 | Leibman | |
| 6,099,220 A | * | 8/2000 | Poth | 410/94 |
| 6,125,972 A | * | 10/2000 | French et al. | |

* cited by examiner

Primary Examiner—Stephen T. Gordon

(57) ABSTRACT

A caster shipping assembly includes a wheel having a radius and a centrally mounted axle. A securing bracket is connected to the wheel. The securing bracket is movable between a shipping position in which the bracket is fastened to a packaging component and the wheel is suspended above the packaging component, and an in-use position in which the wheel is free for rolling contact with a support surface. The bracket can include a pair of side supports secured to opposing sides of the axle, with each of the side brackets having a length greater than the radius of the caster wheel. A plate can be connected to the side brackets. The plate can include a fastening arrangement adapted and constructed to be fastened to a packaging component to suspend the wheel above the packaging component during shipping. A method of securing a caster to a packaging component during shipping is also set forth. The caster includes a wheel having a radius and a centrally mounted axle. In a first step, a securing bracket is connected to the axle of the wheel, with the securing bracket having a length greater than the radius of the wheel. Next, the bracket is moved to a shipping position in which the wheel is suspended above the packaging component. Finally, the bracket is fastened to the packaging component.

4 Claims, 1 Drawing Sheet

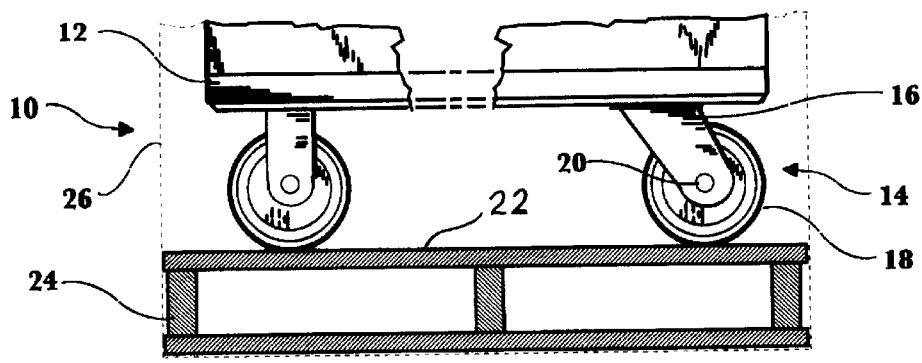
FIG. 1
(PRIOR ART)
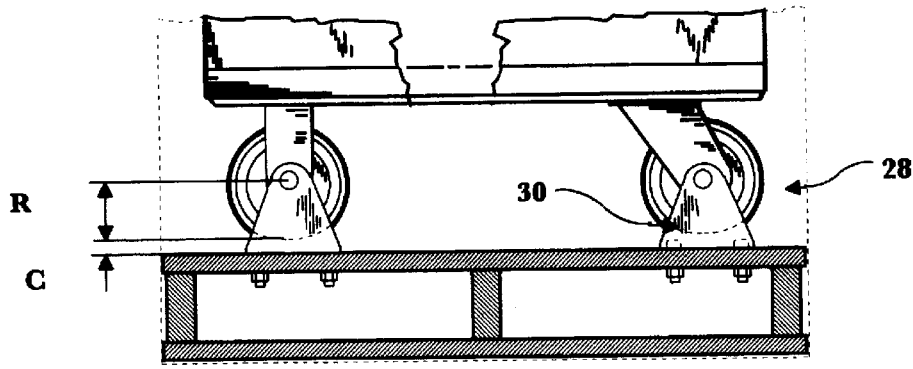
FIG. 2
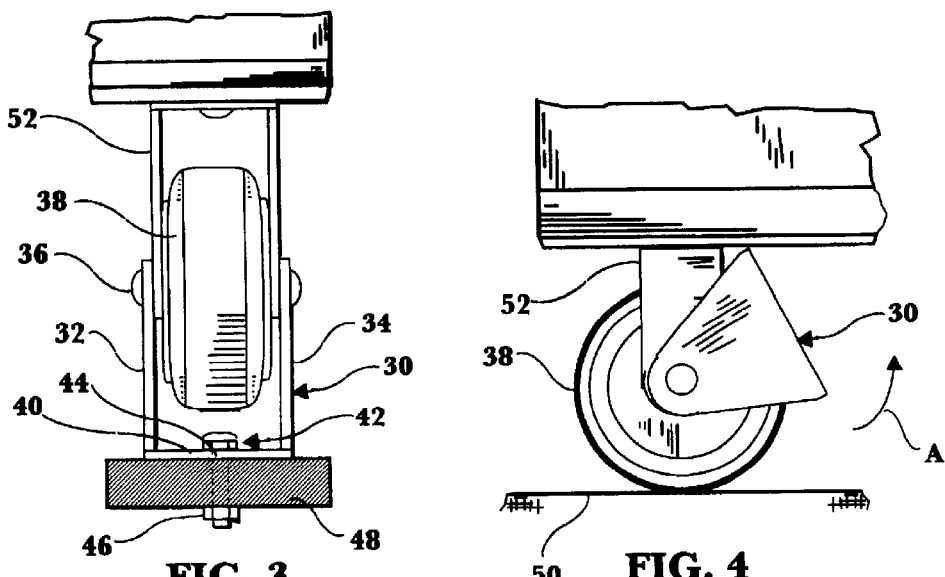
FIG. 3   FIG. 4

CASTER SECURING MECHANISM

FIELD OF THE INVENTION

The invention relates generally to packaging arrangements for shipping. Specifically, the invention relates to a mechanism for securing article-mounted casters during shipping.

BACKGROUND OF THE INVENTION

Imaging systems such as printers, fax machines, and copiers are virtually omnipresent, and can be found in homes and offices worldwide. The development of such systems has facilitated improvements in communications that have in turn fostered a sea change in the ways that people live and work. Telecommuting, "virtual" offices, and intra-office networks represent but a few examples of the advancements that have been made possible by modern imaging systems.

The wide distribution of relatively sensitive electronic components has spawned the development of packaging adequate to protect the systems during transportation and storage. It is known, for example, to provide packaging including plastic foam cushions surrounding portions of the component, surrounded by a rigid container such as a corrugated fiberboard box. The foam cushions are typically located at known potential stress points, such as the corners of the device. A bottom tray or pallette is typically provided at the bottom of the component for cushioning and/or stability during shipping.

Several market segments for imaging systems have arisen to meet the demand for high-volume, multi function systems. The imaging systems in these market segments are typically larger and heavier than typical systems, and are often designed with casters enabling the system to be easily moved within a work environment. While these casters are usually adequate for supporting the systems in use, they are frequently subject to damage or shifting during shipping, thus endangering the integrity of the system itself.

Arrangements for stabilizing casters are known in other contexts. For example, U.S. Pat. No. 4,364,148 to McVicker is directed to a combination dual wheel caster and jack combination assembly. The assembly includes a support structure having a nut-like portion and elongated portions attached to the nut-like portion. The elongated portions extend from the nut-like portion in opposite directions. The support structure includes a hole passing through at least one of the elongated portions and the nut-like portion. The hole is internally threaded along at least a portion of its length. A jack means including an elongated threaded shaft portion and a foot portion rotatably mounted to one end of said shaft portion is adapted to be threaded into the hole in the support structure. By gripping and turning the nut-like portion of the support structure, the shaft portion of the jack means is caused to move relative to the support structure in one direction or the other. A caster portion of the assembly has a pair of wheels which are spaced apart and attached to a swivel frame by an axle. The wheels are free to rotate about the axle. The swivel frame is rotatably mounted to the support structure. The foot portion of the jack means is disposed between the pair of wheels. When the frame has been moved to a predetermined location on the floor, the jack means is lowered until the foot portion contacts the floor and exerts enough pressure to remove the weight of the frame and the equipment from the caster wheels. The foot portion of the support structure includes a hole which is aligned with a hole in the floor. A bolt is passed through the hole in the floor and the hole in the foot portion to attach the frame firmly to the floor.

In another example, U.S. Pat. No. 4,503,943 to Tsukui discusses a caster to be mounted to a movable object, such as a hoop-shaped walking support for baby, a chair or the like. The caster includes a basic body turnably mounted at one end and provided at its opposite end with spaced apart axle supports for wheels. A stopper is mounted to the basic body, and includes a bearing portion received between the axle supports. A grounding surface is adapted to contact the earth for stoppage of the caster. The stopper includes an engaging part for setting the stopper above the lower margin of the wheels, a spring for urging the stopper downward, and a swing limiting projection for limiting the range of the swinging movement of the stopper.

It can be seen from the foregoing that the need exists for a simple, inexpensive, mechanism for protecting and stabilizing casters during shipment of the articles to which the casters are secured.

SUMMARY OF THE INVENTION

A caster shipping assembly includes a wheel having a radius and a centrally mounted axle. A securing bracket is connected to the wheel. The securing bracket is movable between a shipping position in which the bracket is fastened to a packaging component and the wheel is suspended above the packaging component, and an in-use position in which the wheel is free for rolling contact with a support surface.

The bracket can include a pair of side supports secured to opposing sides of the axle, with each of the side brackets having a length greater than the radius of the caster wheel. A plate can be connected to the side brackets. The plate can include a fastening arrangement adapted and constructed to be fastened to a packaging component to suspend the wheel above the packaging component during shipping.

A method of securing a caster to a packaging component during shipping is also set forth. The caster includes a wheel having a radius and a centrally mounted axle. In a first step, a securing bracket is connected to the axle of the wheel, with the securing bracket having a length greater than the radius of the wheel. Next, the bracket is moved to a shipping position in which the wheel is suspended above the packaging component. Finally, the bracket is fastened to the packaging component.

DESCRIPTION OF THE DRAWINGS

FIG. 1 is a schematic side elevational view of a known shipping arrangement.

FIG. 2 is a schematic side elevational view of a caster shipping arrangement in accordance with the principles of the present invention.

FIG. 3 is a detailed front elevational view of the FIG. 2 caster shipping arrangement in its shipping position.

FIG. 4 is a side elevational view of caster shipping arrangement in its in-use position.

DETAILED DESCRIPTION OF THE INVENTION

FIG. 1 illustrates a known packaging arrangement 10 enclosing an article 12 supported by a plurality of caster assemblies 14. Each of the caster assemblies 14 includes a caster base 16. A wheel 18 is mounted on the base 16 via a central axle 20. The wheels 18 rest on an upper surface 22 of a pallette 24. An outer enclosure 26, such as a rigid fiberboard container, surround the article 12 and the pallette 24. Since the wheels 18 are free to roll along the upper surface 22 of the pallette 24, the wheels are liable to shift during shipping. Further, the wheels 18 can deform if the article 12 is stored for a prolonged period of time.

A caster shipping assembly 28 is shown in FIGS. 2 through 4. The assembly 28 includes a securing bracket 30. The securing bracket 30 is provided with a pair of side supports 32, 34 connected to a central axle 36 of a wheel 38. A plate 40 is connected between the respective side supports 32, 34. In the illustrated embodiment, the side supports 32, 34 are fabricated to have a generally triangular shape, and the plate 40 is generally rectangular, with opposite sides of the rectangle being attached to respective sides of the triangular side supports 32, 34. The side supports 32, 34 and plate 40 can be fabricated from any suitable rigid material, such as metal or rigid plastic. The side supports 32, 34 can be formed integrally with the plate 40, or the supports 32, 34 and plate 40 can be fabricated separately and welded together.

A fastening arrangement 42 is provided on the assembly 28. In the illustrated embodiment, the fastening arrangement 42 includes at least one aperture 44, here shown as a pair of apertures, in the plate 40. At least one fastener 46 is provided to fit through the at least one aperture 44 in the plate 40. The fastener 46 can be provided as any suitable fastening mechanism, for example, a threaded fastener such as a threaded nut-and-bolt assembly.

As seen in FIG. 4, the connection between the securing bracket 30 and the axle 36 of the wheel 38 can be provided as a pivoting connection. The bracket 30 is shown in a shipping position in FIGS. 2 and 3. In the shipping position, the bracket 30 is fastened to a packaging component, here shown as a pallette 48. The side supports 32 have a length that is greater than the radius R of the wheel 38, thus suspending the wheel 38 above the pallette 48, thus providing a clearance C. The bracket 30 is shown in its in-use position in FIG. 4, wherein the bracket 30 has been pivoted in the direction of the arrow A. In the in-use position, the wheel 38 is free for rolling contact with a support surface 50, such as a floor. The bracket 30 can be held in position in any known manner, such as by a friction fit between the bracket 30 and the wheel base 52.

It will be appreciated by those of skill in the art that this arrangement can be varied in accordance with the details of the specific caster construction. For example, the bracket can be connected to the caster assembly using only one side support, or, where there is a dual-wheel caster, by using a central support. The present invention provides cost savings by eliminating the need for additional packing components, such as wood blocks, to support articles for shipping. The use of a built-in support bracket decreases the amount of time required to assemble the package without sacrificing the protective abilities of the package, since the bracket is simply pivoted down and fastened. It is also contemplated that the bracket can remain on the article, and be used as a brake after the article is in use.

Although the present invention has been described with reference to specific embodiments, those of skill in the art will recognize that changes may be made thereto without departing from the scope and spirit of the invention as defined by the appended claims.

What is claimed is:

1. A caster shipping assembly comprising the following:

a wheel having a radius and a centrally mounted axle; and a securing bracket connected to the wheel and being movable between a shipping position in which the bracket is fastened to a packaging component and the wheel is suspended above the packaging component, and an in-use position in which the wheel is free for rolling contact with a support surface, wherein the securing bracket comprises the following:

a pair of side supports secured to opposing sides of the axle, each of the side supports having a length greater than the radius of the wheel;

a plate connected to the side supports; and a fastening arrangement adapted and constructed to fasten the plate to the packaging component, wherein the fastening arrangement includes at least one aperture in the plate of the securing bracket.

2. A caster shipping assembly in accordance with claim 1, wherein the fastening arrangement includes at least one fastener constructed to fit through the at least one aperture in the plate of the securing bracket.

3. A caster shipping assembly in accordance with claim 2, wherein the at least one fastener comprises at least one threaded fastener.

4. A caster shipping assembly in accordance with claim 2, wherein the at least one aperture comprises a plurality of apertures.

* * * * *